No. 855,929. PATENTED JUNE 4, 1907.
H. E. BRADLEY.
PNEUMATIC CUSHION FOR VEHICLE WHEELS.
APPLICATION FILED DEC. 21, 1905.
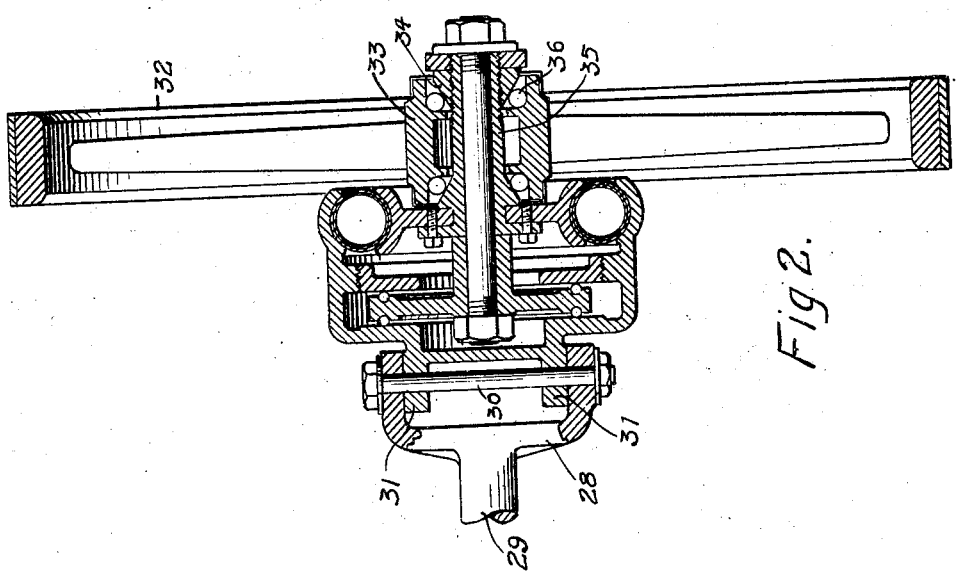
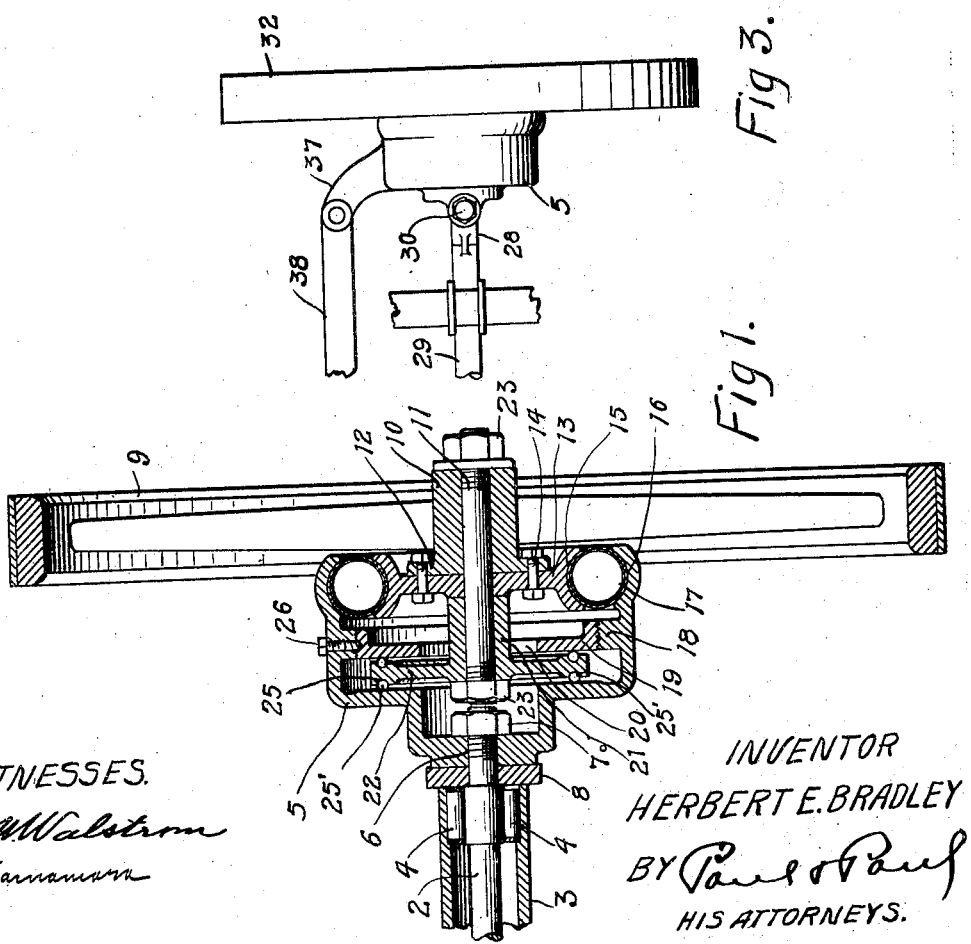
WITNESSES.
INVENTOR
HERBERT E. BRADLEY
BY Paul & Paul
HIS ATTORNEYS.

UNITED STATES PATENT OFFICE.

HERBERT E. BRADLEY, OF HILLSBORO, NORTH DAKOTA.

PNEUMATIC CUSHION FOR VEHICLE-WHEELS.

No. 855,929.　　　Specification of Letters Patent.　　Patented June 4, 1907.

Application filed December 21, 1905. Serial No. 292,688.

*To all whom it may concern:*

Be it known that I, HERBERT E. BRADLEY, of Hillsboro, Traill county, North Dakota, have invented certain new and useful Improvements in Pneumatic Cushions for Vehicle-Wheels, of which the following is a specification.

My invention relates to improvements in wheels designed particularly for automobiles, though applicable to other types of vehicles; and the object of my invention is to provide means for furnishing a cushion support for the wheel taking the place of the ordinary pneumatic tire, to prevent the jar and strain on the wheel and running gear, without such yielding support coming in contact with the ground and being punctured or worn by contact with the rough surfaces of streets or country roads.

The invention consists, generally, in providing a pneumatic ring between the wheel hub and its axle connections, and whereby the shock and jar on the wheel while running over the rough ground is taken up.

Further, the invention consists in various constructions and combinations, all as hereinafter described and particularly pointed out in the claims.

In the accompanying drawings forming part of this specification, Figure 1 is a vertical sectional view illustrating the application of my invention to the rear axle and wheel. Fig. 2 is a similar view showing a slight modification to adapt the device for use on the front axle. Fig. 3 is a plan view showing the connection of the steering attachment to the wheel housing.

In the drawing, 2 represents the rear axle and 3 a pipe inclosing the same and antifriction rollers 4 arranged between the pipe and the axle.

5 is a housing having a hole 6 in one end to receive the threaded end of the axle 2 and secured thereon by a lock nut 7. A washer 8 is preferably arranged on the axle between the housing 5 and the end of the pipe 3.

9 is a carrying wheel having a metal or solid rubber tire as preferred, and a hub 10 mounted on the short or stub axle or shaft 11, and provided with an annular flange 12 at its inner end secured to a disk 13 by bolts 14. The disk 13 has an annular channel or way 15 in its periphery. The edge of the housing 5 has a similar oppositely curved channel or way 16 encircling the one first described, and between which a pneumatic ring 17 is arranged composed preferably of rubber, or other suitable yielding material, and having a valve to permit it to be inflated in the same manner as an ordinary pneumatic wheel tire. An annular rib 18 is provided within the housing 5 having a threaded inner surface to receive the threaded periphery of a disk 19 which has a large central opening 20, through which the shaft 11 extends, and carries a hub 21 provided with a disk 22 at its inner end. The hubs 10 and 18 are held in place on the shaft 11 by lock nuts 23 provided on the threaded ends of the shaft. The disk 22 is provided on each of its vertical faces with annular grooves 25 wherein balls 25′ are arranged and adapted to bear on the inner wall of the housing and the disk 19, said disk being adjustable by means of its threaded connection with the rib 21, to permit the space occupied by the disk 22 to be increased or decreased in depth, until the balls 25 bear evenly on the surfaces of the housing and disk and move freely thereon without binding or sticking. The disk 21 may then be locked by the set screw 26 to prevent its accidental movement. The opening 20 in the disk 19 is of sufficient size to allow a limited vertical and horizontal movement of the hub 18 therein, the disk 22 sliding back and forth in its chamber to adapt itself to such movement. When the wheels run over an uneven surface or strikes an obstruction the hub and axle will be tilted, the pneumatic ring yielding sufficiently to take up the shock or jar when the wheel strikes the obstruction and prevent it from being strained or broken or transmitting the shock to the running gear, as effectually as a pneumatic wheel tire would do, and without being exposed to the danger of puncture and wear resulting from the contact of the tire with the ground.

In Fig. 2 I have shown a modification in the construction, to adapt the device for the front or steering wheels of a vehicle, which consists in providing a fork 28 on the end of the forward axle 29 and pivoting said fork by means of a pin 30 to ears 31 on the forward housing. The forward wheel 32 has a hub 33, between which and cones 34 provided on a sleeve 35 bearing balls 36 are arranged. The shaft within the sleeve 35 corresponds to the one heretofore described, and has lock nuts at each end and a hub at its inner end inclosed by the housing and having the same functions as the hub described with reference to the rear wheel. The pneumatic ring is also the same and is supported in a similar manner, and is arranged to be compressed when the forward wheel strikes an obstruction or is running over an uneven surface, to take up the wear and relieve the wheel and running gear of all unnecessary strain. A bracket 37 is provided on the hub of the forward wheel, to which a link 38 extending to the steering mechanism (not shown) is attached.

I do not wish in this application to be confined to the particular means employed for mounting the wheels on their axles, as the same is capable of considerable modification, my invention consisting essentially in the employment of a pneumatic ring arranged between the wheel hub and its support on the axle, and adapted to act as a cushion for the wheel and take up the shock and wear incident to travel over rough ground without the ring contacting with the ground and being worn thereby.

I claim as my invention:

1. The combination with a vehicle axle and its wheel, of a pneumatic ring interposed between the wheel hub and its support on said axle and concentric with said hub and outside the vertical plane of the wheel, substantially as described.

2. The combination with an axle, of a wheel having a hub, a disk secured on said hub having a channel or way in its periphery, a housing mounted on said axle and also having a channel or way and outside the vertical plane of the wheel, and a pneumatic ring interposed between said channeled disk and housing, for the purpose specified.

3. The combination with an axle, of a housing mounted thereon, a wheel having a hub and shaft, a disk mounted on said shaft and having an antifriction bearing in said housing, and a pneumatic ring interposed between said hub and housing, substantially as described.

4. The combination with a vehicle axle and its wheel, of a disk having an annular way secured to said wheel, a bearing on said axle and a pneumatic ring fitting said way and between it and said bearing and outside the vertical plane of the wheel, substantially as described.

5. The combination, with an axle, of a wheel having a hub and shaft, the latter having a connection with said axle slidable in a vertical plane, a member mounted on said axle and inclosing said shaft, and a pneumatic ring interposed between said shaft and member, substantially as described.

6. The combination, with an axle, of a housing mounted thereon, a wheel having a hub and a shaft, said shaft having a disk at its inner end provided with an anti-friction bearing in said housing and a pneumatic ring inclosing said shaft and yieldingly resisting the tilting of said wheel and shaft, substantially as described.

7. The combination, with an axle, of a wheel and hub, having an oscillating movement independent of said axle, and a pneumatic ring inclosing said hub and located between said wheel and axle and arranged to yieldingly resist the tilting movement of said wheel, substantially as described.

8. The combination with an axle, of a wheel and hub having a movement independent of said axle, and a pneumatic ring arranged to yieldingly resist the tilting movement of said wheel.

9. The combination with an axle, of a wheel and hub, and a pneumatic ring outside the vertical plane of the wheel and arranged to yieldingly resist the tilting movement of said wheel.

In witness whereof, I have hereunto set my hand this 12th day of December 1905.

HERBERT E. BRADLEY.

Witnesses:
J. E. LATHAM,
D. B. HUTCHISON.